Sept. 4, 1934.  H. E. KEMPTON  1,972,565
ROTARY ENGINE
Filed Nov. 14, 1928   2 Sheets-Sheet 1

Inventor:
Herbert E. Kempton,
By Chindah &. Parker & Carlson
Attys

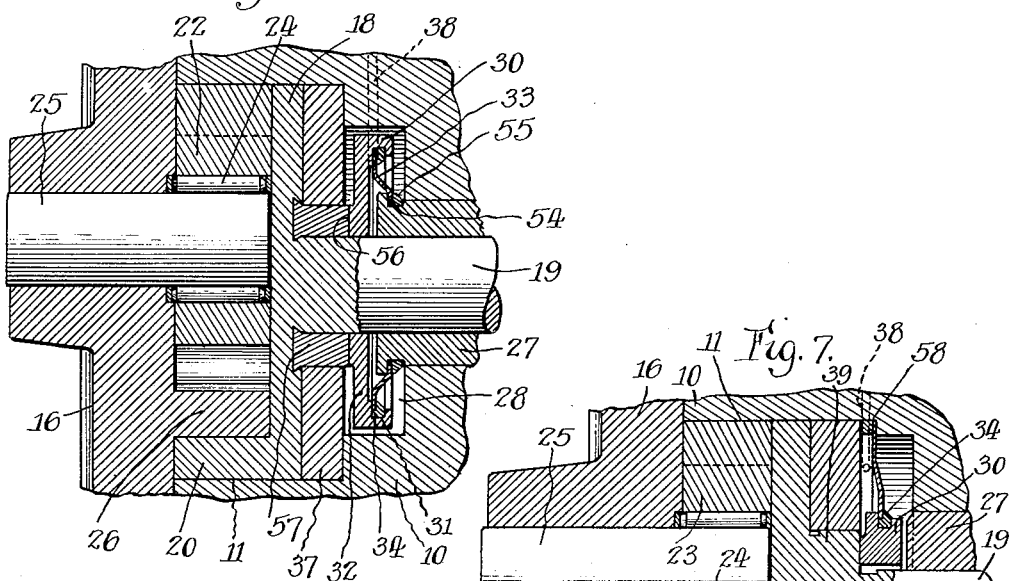
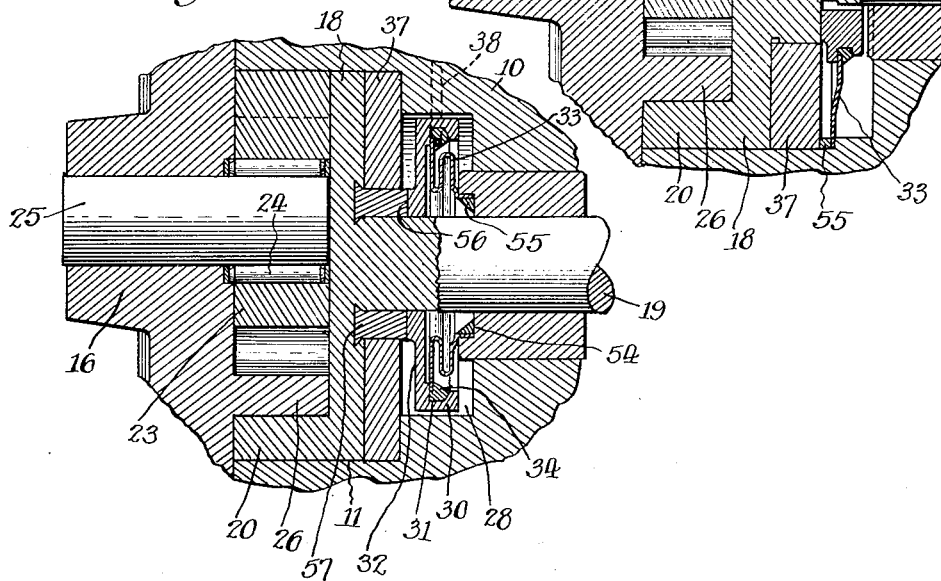

Patented Sept. 4, 1934

1,972,565

UNITED STATES PATENT OFFICE 1,972,565

ROTARY ENGINE

Herbert E. Kempton, Chicago, Ill., assignor to Tuthill Pump Company, Chicago, Ill., a corporation of Illinois Application November 14, 1928, Serial No. 319,217

7 Claims. (Cl. 103—126)

The present invention relates to improvements in rotary engines, particularly of the type in which fluid from a low pressure or suction space is carried by rotary means past suitable cut-off means to a high pressure or discharge space, and has special reference to new and improved seal packings for the rotary parts of such engines.

An important object of the present invention resides in the provision of a novel mechanical seal for preventing the leakage of fluid past certain bearing surfaces for the rotary parts of the engine.

Other general objects of the invention reside in the provision of a new and improved mechanical seal which is not subjected to the operating fluid pressure in the engine, which will not collapse under pressure, in which the sealing surfaces are close to the center of the rotating body, and in which the sealing surfaces are pressed into bearing engagement with a definite pressure by a resilient fluid-tight mounting so as to seat said surfaces squarely and tightly together.

Another important object resides in the provision of a new and improved engine of the foregoing character having a main zone for the operating parts which during operation is always under pressure, and having an auxiliary or sealing zone for the seal packing which during operation is under a low pressure or a vacuum.

A more specific object resides in the provision of a novel fluid engine having a pair of zones, one of which encloses a rotor and the other of which encloses a seal packing for the rotor bearing, and having a partition wall separating the zones and also serving as an end bearing for the rotor, the wall acting to prevent severe leakage from the rotor zone to the packing zone.

A further object resides in the provision of means for venting the packing zone to the suction side of the engine so as to remove the small amount of fluid that may leak thereto from past the partition wall, thereby preventing the seal packing from being under a high pressure.

Still another object resides in the provision of a new and improved engine of the foregoing character in which the rotor is not subjected to severe end thrusts, but is a floating rotor, and in which the rotor does not bear against the outer end wall but runs against the partition wall. This object is accomplished by providing means tending to hold the back of the rotor against the partition plate, and by relieving the plate, particularly in the pressure side of the engine, so as to subject part of the back of the rotor to the operating pressures, and thereby to balance the rotor.

A more specific object resides in the provision in a seal packing comprising a rotary member, a seal ring and a flexible diaphragm for providing a yieldable fluid-tight connection between the member and the ring of an axial opening in the ring large enough to receive a tool for securing the diaphragm to the member, thereby facilitating the assembly of the parts.

A further object resides in the provision of a novel engine having a mechanical seal packing in which the sealing surfaces are not lubricated by the fluid passing through the engine, but in which all the parts of the packing are positively lubricated by oil from a closed or sealed chamber, lubrication being aided by centrifugal force.

Other objects and advantages will become apparent as the description proceeds.

In the accompanying drawings, Figure 1 is a longitudinal vertical sectional view of a device embodying the features of my invention.

Fig. 5 is a fragmentary vertical sectional view of a modified form of my invention.

Fig. 6 is a fragmentary vertical sectional view of another modified form of my invention.

Fig. 7 is a fragmentary vertical sectional view of still another modified form of my invention.

Figure 1:
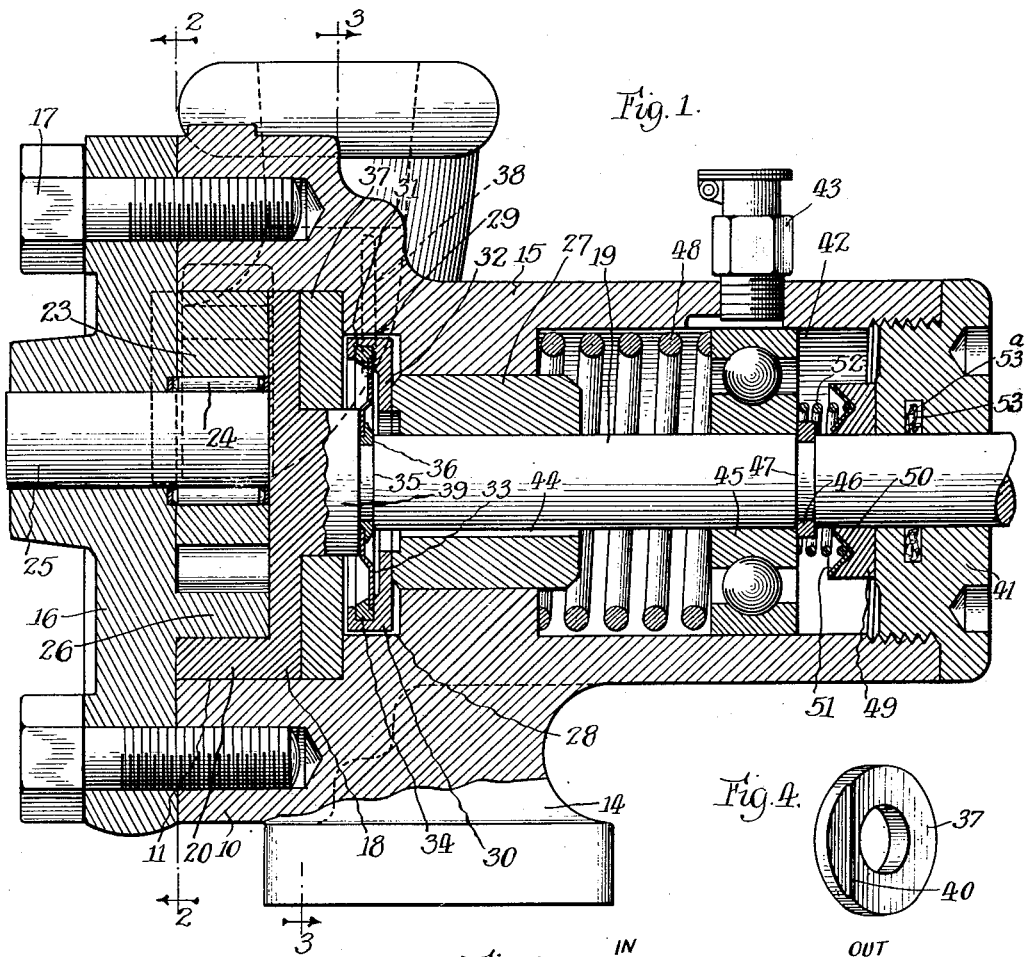

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The invention has a wide range of applicability, and is intended to prevent the leakage of pressure fluid from a chamber, in which it is handled by a revolving member, to or past the bearings for said member. It is particularly adapted for use in rotary engines, such as fluid pumps or motors, and hence I have shown and will describe it in connection with the rotary gear and pinion pump.

Referring more specifically to the exemplary embodiment of the invention illustrated in the drawings, the pump comprises a suitable casing 10 which preferably is cylindrical in shape to provide an inner cylindrical pumping chamber 11. Suitable inlet and outlet passages 12 and 13, respectively, are formed in the casing 10 and open to opposite sides of the chamber 11. Preferably, the casing 10 is formed integral with a suitable support 14, and with a suitable tubular bearing member 15 on one end constituting a closed head therefor. The other end of the casing 10 is closed by a removable head 16 suitably held in place by means of a plurality of bolts 17.

Figure 2:
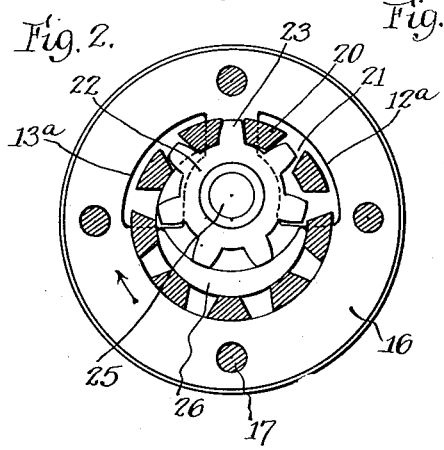
Fig. 2 is a transverse sectional view, on a reduced scale, taken along line 2—2 of Fig. 1.

Rotatably mounted in the chamber 11 and in close peripheral contact therewith is a rotor 18 having a suitable coaxial drive shaft 19 projecting rearwardly therefrom through the bearing sleeve 15 for connection to a suitable source of power (not shown). In the present instance, the rotor 18 is formed on its front end with a plurality of peripherally spaced internal gear teeth or vanes 20 separated by interdental spaces 21. Eccentrically related to the rotor 18 and in mesh with the vanes 20 is a pinion 22 having suitable teeth or vanes 23. The pinion 22 is preferably mounted on roller bearings 24 disposed about the inner end of a pin 25 fixed in the cover plate 16. Disposed between the rotor vanes 20 and the pinion 22 is a crescent cut-off partition 26, which preferably is formed integral with the cover plate 16. The inlet and discharge passages 12 and 13 open to the periphery of the rotor vanes 20, and to a pair of recesses 12ª and 13ª formed in the inner face of the cover plate 16 and communicating with the front ends of the rotor 18 and the pinion 22. In operation, fluid enters the casing 10 through the passage 12, and when the rotor 18 and the pinion 22 are turning in the direction indicated in Fig. 2, is carried past the crescent partition 26 to the outlet passage 13 through which it is discharged. The general construction thus far disclosed excepting the roller bearings 24 is old and well known, and taken by itself forms no part of the present invention.

The present invention resides in part in the provision of means for preventing pressure fluid in the chamber 11 from passing to or through the bearing for the shaft 19. The shaft 19 is suitably journaled in a bushing 27 tightly secured in the inner end of the bearing sleeve 15. Formed in the inner or rear end wall of the chamber 11 is a small concentric chamber 28 into which the bushing 27 slightly extends. A suitable mechanical seal means designated generally as 29 is mounted in the chamber 28 to prevent the leakage of oil from the chamber 11 to the bearing surfaces between the shaft 19 and the bushing 27. This seal also prevents air from passing through the bearing 27 to the chamber 11 which would tend to reduce the priming action. Preventing the leakage of air is of particular importance when handling fuel oil.

Referring to Fig. 1, this seal means comprises an annular ring 30 having an annular recess 31 in its inner periphery, and having an inner radial flange 32 at one end. The outer face of the flange 32 is lap ground, and is adapted to bear against the inner end of the bushing 27 which is also lap ground. The lapped surfaces provide a fluid-tight seal. Secured in the ring 30 to support the same is a diaphragm 33 which may be of any suitable form, and which preferably is resilient. In the present instance, this diaphragm has a fluid-tight connection with the ring 30 in the recess 31 by reason of an annular copper ring 34 swaged or expanded therein. The diaphragm 33 also has a fluid-tight connection with the shaft 19, and hence is rotatable with the latter. To this end, the inner peripheral edge of the diaphragm is secured in an annular notch or lamination 35 in the shaft 19 by means of a copper ring 36 expanded therein. It will be evident that the inherent resiliency of the diaphragm will retain the lapped surfaces in bearing engagement and will cause them to seat squarely together so as to effect a fluid-tight seal.

The annular opening through the flange 32 is of such size that a tool for expanding the ring 36 may be inserted therethrough along the shaft 19 to facilitate this operation. This is a highly advantageous detail of construction resulting in ease of assembly.

A mechanical seal is most efficient when it is not subjected to high pressures since where such pressures are impressed thereon small amounts of fluid may ultimately work between the lapped surfaces and hence corrode and break down the latter. Means is therefore provided for maintaining a relatively low pressure about the seal. This means comprises a partition wall 37 rigidly secured in the inner end of the chamber 11 and separating the chambers 11 and 28 to constitute the chamber 11 a high pressure zone. The chamber 28 is connected through a suitable vent passage 38 formed in the casing 10 to the suction or inlet passage 12, and thus constitutes a suction or low pressure zone. The partition wall 37 prevents severe leakage from the high pressure chamber 11 to the chamber 28, and the fluid leaking thereto is so small in amount that the suction vent 38 carries it off to maintain a low pressure about the seal. To provide a shoulder for the inner peripheral portion of the diaphragm 33, the rotor 18 is provided with an enlargement 39 which extends through the partition wall 37 to the notch 35.

Figure 4:
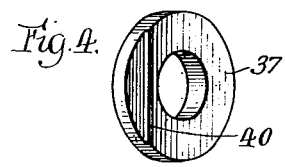
Fig. 4 is a perspective view on a reduced scale of the partition wall.
Figure 3:
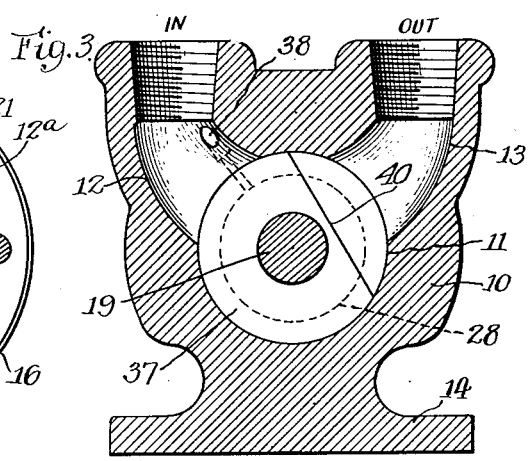
Fig. 3 is a transverse sectional view, on a reduced scale, taken along line 3—3 of Fig. 1.

The rear end of the rotor 18 will run against the partition wall 37 due to the pressure on the free end of the rotor. This is to be desired as against wearing contact with the end plate 16, and to insure same additional means is provided as will be described hereinafter tending to move the rotor from the plate and toward the wall 37. To prevent excessive wear on the partition wall 37 and the rear end of the rotor 18, the former is cut away in the pressure side of the pump along line 40, as indicated in Figs. 3 and 4, to provide a small space or pressure relief 40, the pressure in which opposes the rearward thrust on the rotor. As a result the rotor 18 practically floats in the chamber 11, thereby resulting in a minimum amount of wear.

By pressing the rotor away from the plate 16, searing or wearing of the teeth 20, which otherwise would quickly occur, particularly in a motor drive where there is a tendency to surge endwise, is avoided. The rear surface of the rotor, being large in area does not wear appreciably. The prevention of wear is important since wear lowers the effectiveness of the priming action and increases clearances.

Means is provided for lubricating the bearing surfaces and the seal. To this end, the rear end of the shaft 19 extends through a suitable packing gland 41 closing the outer end of the bearing sleeve 15. The bearing sleeve 15 is enlarged between the bushing 27 and the gland 41 to provide a lubricating chamber 42 adapted to be filled with lubricant through a suitable fitting 43. The bushing 27 is formed with a longitudinal groove or notch 44 next to the shaft 19 for admitting lubricant to the bearing surfaces and the lapped sealing surfaces. It will be evident that in the present instance, the bearing parts are lubricated by a special lubricant instead of by fluid leaking thereto from the chamber 11.

Supporting the shaft 19 in the chamber 42 is a suitable ball bearing 45. One end of the inner raceway of the ball bearing 45 abuts against a washer 46 fixed in an annular groove 47 in the shaft. Disposed between the inner end wall of the chamber 42 and the outer raceway of the ball bearing 45 is a heavy coil spring 48 which serves to hold the ball bearing from rotating and against the washer 46, and to hold the rotor 18 against the partition wall 37.

Mounted on the shaft 19 between the packing gland 41 and the ball bearing 45 is a suitable cup leather lap ring 49 which bears against the inner end of the gland. The free end of the ring 49 is formed with an annular V-shaped notch 50 in which a similarly shaped steel washer 51 is suitably disposed. A coil spring 52 is disposed about the shaft 19 between the washer 46 and the inner raceway of the ball bearing 45, and serves to hold the ring 49 against the gland 41 so as to provide a seal for the lubricant. A suitable packing 53 such as felt, is disposed in a notch 53ª in the gland 41 about the shaft 19, and assists in preventing leakage of lubricant and serves to prevent the entry of foreign matter.

It will be evident that the seal ring 30 may rotate with the shaft 19 or may be fixed in the casing 10. In Fig. 1, the ring is rotatable with the shaft. In Figs. 5, 6 and 7, the ring 30 is fixed in the casing against rotation and bears against the rotatable part. Referring first to Fig. 5, the inner edge of the diaphragm disk 33 is secured in an annular notch 54 in the inner end of the bushing 27 by means of a ring 55, the bushing being extended into the chamber 28 for this purpose. The outer edge of the diaphragm 33 is secured to the ring 30 in the same manner as in Fig. 1. The radial flange in this form of the invention, projects to the periphery of the shaft and bears against a lapped shoulder 56. The shoulder may be provided by the enlargement 39 of the shaft as shown in Fig. 1, or by a separate ring 57 tightly secured thereover and swaged to the rotor 18.

The construction in Fig. 6 is substantially the same as in Fig. 5 with the exception that the diaphragm 33 is corrugated so as to form a sylphon, and the notch 54 is formed in the end of the bushing 27. The natural resiliency of the material in the diaphragm serves to present the lapped surfaces squarely together, and to compensate for irregularities.

In the form shown in Fig. 7, the outer edge of the diaphragm 33 is secured in a peripheral notch 58 in the chamber 28, and the ring 30 is secured to the inner edge of the diaphragm and bears against the enlargement 39.

I claim as my invention:

1. A rotary engine having, in combination, a casing constituting a first part, having a chamber and having inlet and discharge passages opening to said chamber, said chamber being formed intermediate its ends with an inner peripheral shoulder, a stationary partition plate positioned in said chamber against said shoulder, said partition plate dividing said chamber into a main zone and an auxiliary zone, fluid-handling mechanism operatively disposed in said main zone and having a rotary element extending through said partition wall into said auxiliary zone and constituting a second part, and mechanical fluid seal means in said auxiliary zone rigidly secured to one of said parts and bearing against the other of said parts.

2. A rotary engine having, in combination, a casing formed with a bearing constituting a first part, said casing having an oiling chamber at one end of said bearing and a sealing chamber at the other end of said bearing, a rotary element having a shaft journaled in said bearing, said shaft extending through said sealing chamber and said oiling chamber and constituting a second part, a seal in said sealing chamber having a fixed fluid-tight connection with one of said parts and a fluid-tight bearing engagement with the other of said parts, said seal defining a small space about said shaft between said bearing and said seal, said bearing being formed with an oiling connection between said space and said oiling chamber, and means for sealing the outer end of said oiling chamber against the escape of oil along said shaft.

3. A rotary engine having, in combination, a casing having a main chamber in one end and an oiling chamber in the other end, a bearing intermediate said chambers, a partition wall dividing said main chamber into a main zone and an auxiliary zone, a fluid handling mechanism in said main zone, said mechanism comprising a rotary part having a shaft extending through said partition wall, said auxiliary zone, said bearing and said oiling chamber, a mechanical seal having a fluid-tight connection with said shaft in said auxiliary zone and bearing against one end of said bearing, an oiling passage formed in said bearing, and means in said oiling chamber tending to move said shaft longitudinally to hold said rotary part against said partition wall and to hold said seal against said bearing.

4. A rotary engine having, in combination, a casing having a main chamber in one end, an oiling chamber in the other end, and inlet and exhaust passages communicating with said main chamber, a bearing intermediate said chambers, a partition wall dividing said main chamber into a main zone and an auxiliary zone, a fluid-handling mechanism in said main zone, said mechaanism comprising a rotary part having a shaft extending through said partition wall, said auxiliary zone, said bearing and said oiling chamber, a mechanical seal having a fluid-tight connection with said shaft in said auxiliary zone and bearing against a surface in fluid-tight engagement with the casing, an oiling passage formed in said bearing to convey oil from the oiling chamber to lubricate the seal, and means tending to move said shaft longitudinally to hold said rotary part against said partition wall and to hold said seal against said casing surface.

5. A rotary engine having, in combination, a casing having a main chamber in one end, an oiling chamber in the other end, and inlet and exhaust passages communicating with said main chamber, a bearing intermediate said chambers, a partition wall dividing said main chamber into a main zone and an auxiliary zone, a fluid-handling mechanism in said main zone, said mechanism comprising a rotary part having a shaft extending through said partition wall, said auxiliary zone, said bearing and said oiling chamber, means for venting said auxiliary zone to said inlet passage, a mechanical seal in said auxiliary zone, an oiling passage formed in said bearing for carrying oil from the oiling chamber to the seal, and means in said oiling chamber tending to move said shaft longitudinally to hold said rotary part against said partition wall.

6. A rotary engine having, in combination, a casing formed to provide a cylindrical pumping chamber in one end thereof and inlet and discharge passages communicating with said chamber, and having an auxiliary chamber of smaller diameter concentric with said pumping chamber, a bearing adjacent said auxiliary chamber, an apertured disk secured against one end of said pumping chamber and forming a partition between the pumping chamber and said auxiliary chamber, fluid handling mechanism in said pumping chamber including a rotary element engaging said disk, a shaft for driving said element extending through the aperture in said partition and through said bearing, and a mechanical seal in said auxiliary chamber comprising a rotary part in fixed fluid-tight engagement with said shaft and a stationary part in fixed fluid-tight engagement with said casing so as to prevent leakage from said pumping chamber to said bearing.

7. A rotary engine having, in combination, a casing formed to provide a cylindrical pumping chamber in one end thereof and inlet and discharge passages communicating with said chamber, and having an auxiliary chamber of smaller diameter concentric with said pumping chamber, a bearing adjacent said auxiliary chamber, an apertured disk secured against one end of said pumping chamber and forming a partition between the pumping chamber and said auxiliary chamber, fluid handling mechanism in said pumping chamber including a rotary element engaging said disk, a shaft for driving said element extending through the aperture in said partition and said bearing, means for venting said auxiliary chamber to said inlet passage, and a mechanical seal in said auxiliary chamber comprising a rotary part in fixed fluid-tight engagement with said shaft and a stationary part in fixed fluid-tight engagement with said casing so as to prevent leakage from said pumping chamber to said bearing.

HERBERT E. KEMPTON.